US008750171B2

(12) United States Patent
Schulz et al.

(10) Patent No.: US 8,750,171 B2
(45) Date of Patent: Jun. 10, 2014

(54) FEMTOCELL/WLAN COMMUNICATION DEVICE

(71) Applicant: Huawei Technologies Co., Ltd., Guangdong (CN)

(72) Inventors: Egon Schulz, Munich (DE); Chan Zhou, Munich (DE); Malte Schellmann, Munich (DE); Yi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/728,309

(22) Filed: Dec. 27, 2012

(65) Prior Publication Data

US 2013/0182694 A1 Jul. 18, 2013

Related U.S. Application Data

(63) Continuation of application No. PCT/EP2011/071639, filed on Dec. 2, 2011.

(51) Int. Cl.
*H04B 1/58* (2006.01)
*H04B 3/36* (2006.01)
*H04B 10/00* (2013.01)

(52) U.S. Cl.
USPC ........... 370/276; 370/293; 370/297; 370/339; 455/562.1; 398/115; 398/153

(58) Field of Classification Search
USPC ................. 370/276–280, 293, 328–329, 338, 370/465–466, 297; 455/560, 561, 562.1, 455/421–422.1, 426, 277; 398/115, 153
See application file for complete search history.

(56) References Cited

U.S. PATENT DOCUMENTS

| 2004/0100930 A1 | 5/2004 | Shapira et al. |
| 2004/0203703 A1 | 10/2004 | Fischer |
| 2006/0209800 A1 | 9/2006 | Lee et al. |

(Continued)

FOREIGN PATENT DOCUMENTS

| CN | 101388721 A | 3/2009 |
| CN | 101389145 A | 3/2009 |

OTHER PUBLICATIONS

Foreign Communication From a Counterpart Application, PCT Application PCT/EP2011/071639, International Search Report dated Jun. 18, 2012, 4 pages.

(Continued)

*Primary Examiner* — Habte Mered
(74) *Attorney, Agent, or Firm* — Conley Rose, P.C.; Grant Rodolph; Nicholas K. Beaulieu

(57) ABSTRACT

An Femtocell/WLAN communication device, comprising a Femtocell module for cellular wireless communications, the Femtocell module having an input for receiving a first electrical input signal and an output for outputting a first electrical output signal, a WLAN module for WLAN communications, the WLAN module having an input for receiving a second electrical input signal and an output for outputting a second electrical output signal, an optical interface having a first conversion path connected to the output of the Femtocell module, a second conversion path connected to the output of the WLAN module, a third conversion path connected to the input of the Femtocell module, and a fourth conversion path connected to the input of the WLAN module, and a common port for receiving the first optical input signal and the second optical input signal, and for outputting the first optical output signal and the second optical output signal.

19 Claims, 3 Drawing Sheets

(56) References Cited

U.S. PATENT DOCUMENTS

2007/0133995 A1* 6/2007 Lee et al. .................. 398/115
2011/0076018 A1* 3/2011 Ghiggino et al. ............ 398/58
2013/0088407 A1* 4/2013 King et al. ................ 343/905
2013/0150063 A1* 6/2013 Berlin et al. .............. 455/450

OTHER PUBLICATIONS

Foreign Communication From a Counterpart Application, PCT Application PCT/EP2011/071639, Written Opinion dated Jun. 18, 2012, 7 pages.

* cited by examiner

FEMTOCELL/WLAN COMMUNICATION DEVICE

CROSS-REFERENCE TO RELATED APPLICATIONS

This application is a continuation of International Application No. PCT/EP2011/071639, filed on Dec. 2, 2011, which is hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to Femtocell and wireless local area network (WLAN) communications.

BACKGROUND

In cellular wireless telecommunications a Femtocell is a part of cellular mobile network formed by a small cell having a typical range of operation on the order of 10 meters a small cellular base station. The Femtocell is a complement to the macrocell having a range on the order of several kilometers, microcell typically having a range of less than two kilometers, and picocell typically having a range of 200 meters or less. Its base station connects to the service provider's network via broadband connection (like for example digital subscriber line (DSL) or cable) and supports a limited number of active mobile terminals. A Femtocell allows service providers to extend service coverage indoors and in areas with limited or without any access. Known Femtocells are designed for wideband code division multiple access (WCDMA) although the concept is applicable to all standards including for example global system for mobile communications (GSM), CDMA2000, Time Division Synchronous Code Division Multiple Access (TD-SCDMA), WiMAX and long term evolution (LTE) networks. It can be used to solve the coverage and hotspot problem of the conventional macrocells, microcells and picocells. The typical usage area of a Femtocell is the indoor scenario such as office and residential buildings. The Femtocell base station, also called Femto Access Point, usually uses common internet connection as the backhaul forming a connection to a core network. As the coverage of a Femtocell is small, the transmission power of the Femtocell base station is relative low, usually less than 100 milliwatts (mW).

The demand on high speed wireless services increased rapidly during the last years. A major part of wireless services is provided in the indoor area such as offices, residences and campus buildings. As macro base stations usually have limited capacity and coverage performance in such areas, the service quality may be heavily impaired. In order to avoid a service declination, Femtocell base stations are deployed in the buildings where the access to macro cells is limited or unavailable. The Femtocell is regarded as a promising solution for indoor coverage problem and the employment of Femtocell base stations is becoming more prevalent. However, its comparatively low transmission power is in some scenarios also a limitation of the Femtocell base station. Because of the strong attenuation by walls and ceiling, the coverage of a Femtocell base station is usually restricted to one story and few rooms. In order to cover a service area in entire building, multiple Femtocell base stations have to be installed in dispersive locations.

For indoor communications, WLAN is the most popular technology for providing wireless access to indoor users. Similar to the Femtocell base stations, WLAN base stations also have to be placed in dispersive locations in the building in order to avoid coverage holes in the service range. Usually, Femtocell and WLAN are co-located in the same area to serve the different groups of wireless users, which may cause higher energy consumption, generate increased interference in the neighboring environment, and increase backhaul costs due to an exchange of more signaling data.

SUMMARY

It is the object of the invention to provide an efficient concept for Femtocell and WLAN communications.

This object is respectively achieved by the subject matter of the independent claims. Further implementation forms are apparent from the dependent claims, the description and the figures.

The invention is based on the finding that an efficient concept for cellular wireless and WLAN communications may be provided upon the basis of an integrated Femtocell/WLAN communication device.

According to a first aspect, the invention relates to a Femtocell/WLAN communication device for cellular wireless and WLAN communications. The Femtocell/WLAN communication device comprises a Femtocell module for cellular wireless communications, the Femtocell module having an input for receiving a first electrical input signal and an output for outputting a first electrical output signal, a wireless local area network module (WLAN) for WLAN communications, the WLAN module having an input for receiving a second electrical input signal and an output for outputting a second electrical output signal.

The Femtocell/WLAN communication device further comprises an optical interface having a first conversion path connected to the output of the Femtocell module, a second conversion path connected to the output of the WLAN module, a third conversion path connected to the input of the Femtocell module, and a fourth conversion path connected to the input of the WLAN module, wherein the first conversion path is configured to convert the first electrical output signal of the Femtocell module into a first optical output signal, wherein the second conversion path is configured to convert the second electrical output signal of the WLAN module into a second optical output signal, wherein the third conversion path is configured to convert a first optical input signal into the first electrical input signal, and wherein the fourth conversion path is configured to convert a second optical input signal into the second electrical input signal. The optical interface has a common port for receiving the first optical input signal and the second optical input signal, and for outputting the first optical output signal and the second optical output signal.

The Femtocell/WLAN communication device may for example deploy the radio-over-fiber technology which enables to modulate light by a radio signal and to transmit modulated light over an optical fiber link to one or more antennas. Using radio-over-fiber technology provides the advantage that analog radio signals can be transmitted through fiber without the need of analog to digial (A/D) and digital to analog (D/A) conversion. Alternatively, however, the Femtocell/WLAN communication device according to the invention may also deploy any other digital optical transmission technologies. The radio signal modulating light may originate from the Femtocell module or from the WLAN module. Both modules are coupled to the common optical interface which is arranged for converting electrical output signals of the respective module into modulated optical output signals which may be transmitted towards an optical fiber link to one or more transmit antennas. Correspondingly, the optical interface receives an optical signal and converts the received optical signal into an electrical input signal which is then provided either to the Femtocell module or to the wireless local area network. For conversion, the optical interface may be equipped with one electronic/optical converter for both the conversion of signals from the WLAN module and the Femtocell module. Alternatively, one electronic/optical converter can be foreseen for signals from the WLAN module and one electronic/optical converter can be foreseen for signals from the Femtocell module.

The Femtocell/WLAN communication device may be deployed to provide wireless services in heterogeneous wireless networks consisting of GSM/universal mobile telecommunications system (UMTS)/LTE cellular networks and WLAN.

According to a first implementation form of the first aspect, the first electrical output signal and the second electrical output signal are analog signals, the first conversion path is configured to directly convert the first electrical output signal into the first optical output signal, and the second conversion path is configured to directly convert the second electrical output signal into the second optical output signal.

According to a second implementation form of the first aspect, the first electrical input signal and the second electrical input signal are analog signals, and the third conversion path is configured to directly convert the first optical input signal into the first electrical input signal, and the fourth conversion path is configured to directly convert the second optical input signal into the second electrical input signal.

According to the first and second implementation form of the first aspect, the electro-optical conversion is performed upon the basis of analog signals. Therefore, additional analog-to-digital and digital-to-analogue converters can be avoided.

According to a third implementation form of the first aspect, the first conversion path and the second conversion path comprise a common electrical to optical converter, and the third conversion path and the fourth conversion path comprise one common optical to electrical converter.

According to a fourth implementation form of the first aspect, the optical interface comprises one directional coupler coupling the first conversion path, the second conversion path, the third conversion path and the fourth conversion path to the common port. Such fourth implementation form could advantageously be used with only one optical fiber for both transmission directions. However, the transmission technology for bidirectional transmission might be more complex.

According to a fifth implementation form of the first aspect, the optical interface comprises a first coupler for coupling the first conversion path and the second conversion path to a first optical fiber, and a second coupler for coupling the third conversion path and the fourth conversion path to a second optical fiber. When compared to the fourth implementation form, the fifth implementation alternatively uses separate fiber lines for uplink and downlink signals. Therefore, instead of the one coupler according to the fourth implementation form two couplers may be foreseen for connecting to optical fibers. Such fifth implementation form could advantageously be used with less complex transmission technology. However, it could require one optical fiber for each transmission direction.

According to a sixth implementation form of the first aspect, the Femtocell module is configured to communicate upon the basis of at least one of the following communication technologies: UMTS, in particular UMTS HSXPA, and LTE. UMTS HSXPA includes UMTS High Speed Uplink Packet Access (UMTS HSUPA), UMTS High Speed Downlink Packet Access (UMTS HSDPA) and UMTS High Speed Packet Access Evolution (UMTS HSPA+).

According to a seventh implementation form of the first aspect, the Femtocell module is a Femtocell base station and the WLAN module is a WLAN base station. The Femtocell base station and the WLAN base station are integrated within the same communication device. For the WLAN base station, the total possible rang of the frequency band can for example be from 2.4 gigahertz (GHz) up to 5 GHz. For the Femtocell base station, the total possible range of the frequency band can for example be from 400 megahertz (MHz) up to 2.7 GHz. Preferred frequency band may be 2.4 GHz for WLAN base station and for the Femto base station operating according to the UMTS technology, the band can for example be 2.1 GHz. For each of the two technologies preferred examples of the total possible range are 2.4/2.1 GHz. respectively.

Preferably, the frequency bands of both technologies' base stations should be close enough together to use the same frequency so that one antenna can be applied for both. The preferred range certainly depends on filter technology and antenna technology. In case of too much difference between frequency bands for wireless cellular and WLAN technology an antenna module having different antennas would be required.

According to an eighth implementation form of the first aspect, the common port is connectable to an optical fiber. In particular, the common port forms an optical input/output of the Femtocell/WLAN communication device.

According to a ninth implementation form of the first aspect, the Femtocell/WLAN communication device further comprises a common network port coupled to a network input of the Femtocell module and to a network input of the WLAN module for network communications, e.g. Ethernet communications.

According to a tenth implementation form of the first aspect, the Femtocell/WLAN communication device is configured to communicate over an optical fiber upon the basis of the radio-to-fiber technology.

According to a second aspect, the invention relates to Femtocell/WLAN communication method for Femtocell/WLAN communications using a Femtocell module for Femtocell communications and a wireless local area network module (WLAN module) for WLAN communications, the Femtocell module having an input for receiving a first electrical input signal and an output for outputting a first electrical output signal, the WLAN module having an input for receiving a second electrical input signal and an output for outputting a second electrical output signal, and an optical interface having a first conversion path connected to the output of the Femtocell module, a second conversion path connected to the output of the WLAN module, a third conversion path connected to the input of the Femtocell module, and a fourth conversion path connected to the input of the WLAN module. The method comprises converting the first electrical output signal of the Femtocell module into a first optical output signal by the first conversion path, converting the second electrical output signal of the WLAN module into a second optical output signal by the second conversion path, outputting the first optical output signal and the second optical output signal at a common port, receiving the first optical input signal and the second optical input signal at the common port, converting a first optical input signal into the first electrical input signal by the third conversion path, and converting a second optical input signal into the second electrical input signal by the fourth conversion path.

Further method steps are directly derivable from the functionality of the Femtocell/WLAN communication device of the first aspect.

BRIEF DESCRIPTION OF THE DRAWINGS

Further embodiments of the invention will be described with respect to the following figures, in which.

DETAILED DESCRIPTION

Figure 1:
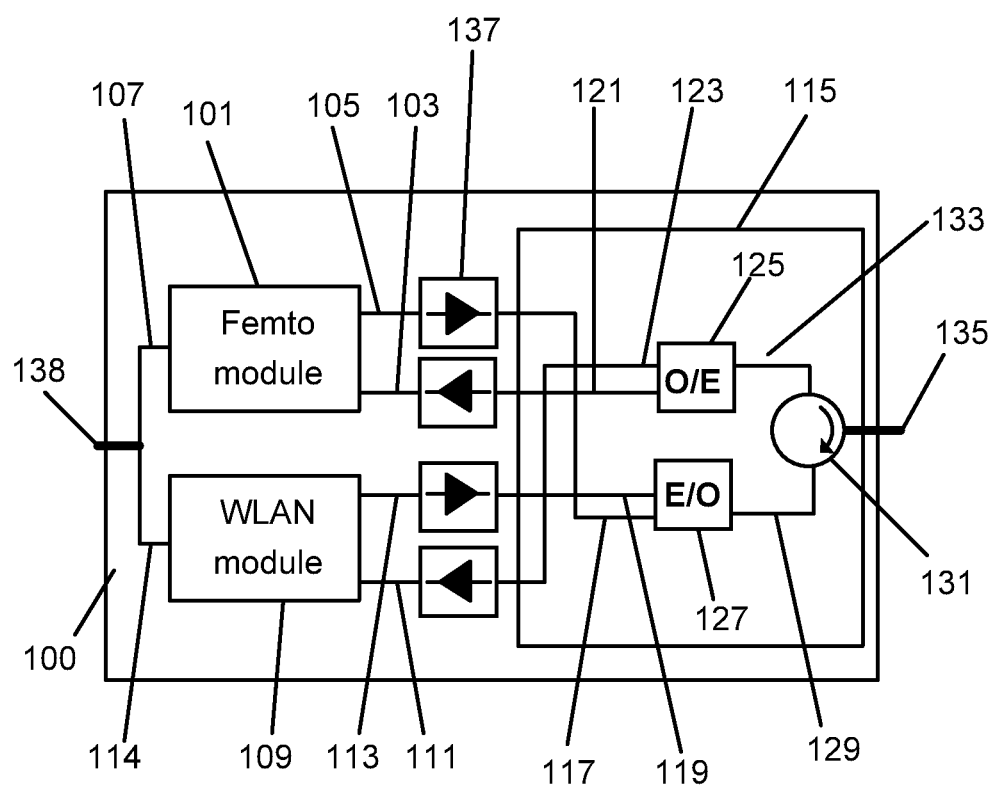
FIG. 1 shows a block diagram of a Femtocell/WLAN communication device according to an implementation form.

FIG. 1 shows a block diagram of a Femtocell/WLAN communication device 100 according to an implementation form. The Femtocell/WLAN communication device 100 comprises a Femtocell module 101 for Femtocell communications. The Femtocell module comprises an input 103 for receiving a first electrical input signal and an output 105 for outputting a first electrical output signal. The Femtocell module further comprises a network port 107 for receiving network signals from e.g. an Ethernet network. According to an implementation form, the Femtocell module 101 is a Femtocell base station.

The Femtocell/WLAN communication device 100 further comprises a WLAN module 109 having an input 111 for receiving a second electrical input signal having an output 113 for outputting a second electrical output signal. According to an implementation form, the WLAN module 109 is a WLAN base station.

The Femtocell/WLAN communication device 100 further comprises an optical interface 115 with a first conversion path 117 connected to the output 105 of the Femtocell module 101, and a second conversion path 119 connected to the output 113 of the WLAN module 109. The optical interface 115 further comprises a third conversion path 121 connected to the input 103 of the Femtocell module 101, and a fourth conversion path 123 connected to the input 111 of the WLAN module 109.

According to an implementation form, the first conversion path 117 and the second conversion path 119 share a common electrical to optical converter 125. However, the first conversion path 117 and the second conversion path 119 may respectively be equipped with an own electrical to optical converter.

Correspondingly, the third conversion path 121 and the fourth conversion path 123 share a common optical to electrical converter 127. However, the third conversion path 121 and the fourth conversion path 123 may respectively be equipped with an own optical to electrical converter.

According to an implementation form, the electrical to optical converter 125 has an output 129 coupled to an input of a directional coupler 131. Correspondingly, the optical to electrical converter 127 has an input 133 coupled to an output of the directional coupler 131.

According to an alternative implementation form, two parallel fibers can be used to transmit/receive the uplink/downlink signals separately. Thus, the directional coupler 131 can be left out. In that case, twisted pair optical cable can for example be used for electrical communications with the modules 101, 109 instead of using a single cable.

The Femtocell/WLAN communication device 100 further comprises a common port 135 for receiving the respective optical input signal and for outputting the respective output signal. The common port 135 is arranged for connecting the Femtocell/WLAN communication device 100 to an optical fiber which is not shown in FIG. 1.

Optionally, the respective electrical path 117 to 123 comprises a power amplifier 137, for unidirectionally forwarding electrical output signals to the electrical to optical converter 125 and for unidirectionally forwarding electrical input signals from the optical to electrical converter 127 to the respective input of the respective module 101, 109.

According to an implementation form, the WLAN module 109 comprises a network input 114. The network port 107 and 114 are connected to a common network port 138, e.g. Ethernet network port.

According to an implementation form, as shown in FIG. 1, the Femtocell module 101 and the WLAN module 109 are integrated into the Femtocell/WLAN communication device 100.

According to an implementation form, the Femtocell/WLAN communication device 100 may have an antenna which can be used to transmit wireless signals, in particular in parallel to the optical signal transmitted over the optical fiber.

The output signals, i.e. the transmission signals, and the input signals, i.e. the reception signals, of the Femtocell/WLAN communication device 100 are provided via the common port 135 and can be transferred from the Femtocell module 101 and the WLAN module 109 through optical fibers to remote antennas which may be located in dispersive parts of a building. According to some implementation forms, the optical fiber and the remote antennas are shared by the Femtocell module 101 and the WLAN module 109 to provide an extended coverage of the Femtocell module 101 and of the WLAN module 109 to the entire building.

Figure 2:
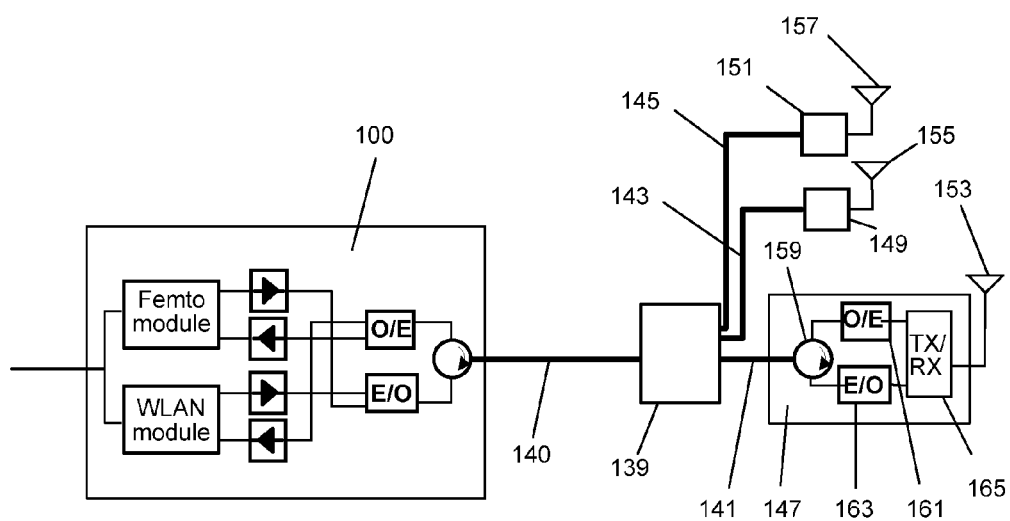
FIG. 2 shows a block diagram of a Femtocell/WLAN communication system according to an implementation form.

FIG. 2 shows a block diagram of an indoor communication system according to an implementation form. The indoor communication system comprises the Femtocell/WLAN communication device 100 as depicted in FIG. 1. The common port output 135 is connected to an optical fiber 140. The optical fiber 140 is coupled to an optical splitter 139 having a plurality of outputs, each being connected to a respective optical fiber 141, 143 and 145. Each optical fiber 141-145 is connected via a respective remote antenna unit 147, 149 and 151 with a respective antenna 153, 155 and 157 of a plurality of remote antennas. Each remote antenna unit 147, 149, 151, comprises a directional coupler 159 coupled to a respective optical fiber 141, 143 and 145, an optical to electrical converter 161 for converting optical input signals into electrical input signals, an electrical to optical converter 163 for converting electrical output signals, i.e. transmit signals, into optical output signals, and a transmit-receive filter (RX/TX) 165 directly coupled to the optical to electrical converter 161 and to the electrical to optical converter 163. The transmit-receive filter (RX/TX) 165 are provided for separating a transmit path from a receive path. Sc shown in FIGS. 1 and 2, the analog signals can be seamlessly converted. Each transmit-receive filter (RX/TX) 165 is coupled to a respective antenna 153, 155, 157.

With reference to FIGS. 1 and 2, the Femtocell/WLAN communication device 100 can be connected with distributed remote antennas using the radio-over-fiber technology. In downlink direction, the output signal, i.e. the transmit signal from Femtocell/WLAN module 101, 109 is converted into the optical output signal and emitted into fiber. After the optical splitter 139, the same signal is transmitted to all remote antenna units 143, 145, 147. At the respective remote antenna unit 143, 145, 147, respective the optical signal is converted back to an electrical signal which is transmitted by a respective antenna 153, 155, 157. According to some implementation forms, no additional power amplifier is required at the remote antenna unit 143, 145, 147. Thus, the signal power is provided via radio-over-fiber directly. All remote antennas 153, 155, 157 can for example have the same transmit power level which is determined by the output power level of the Femtocell/WLAN module 101, 109.

In uplink direction, the received signal at the remote antenna 153, 155, 157 is transferred to the Femtocell/WLAN module 101, 109 in a reversed process.

Both Femtocell module 101 and the WLAN module 109 can utilize the distributed antenna system comprising fiber and remote antenna units 143, 145, 147 simultaneously. According to an implementation form, the remote antenna units 143, 145, 147 do not require additional power supply. Since, in particular in an indoor scenario, a distance between Femtocell/WLAN module 101, 109 and the remote antennas 153, 155, 157 is less than hundred meters, the attenuation caused by an optical fiber is rather low. Hence, a transmit power level, e.g. 20 mV-100 mV, can be achieved without additional power amplifiers at the remote antenna units 143, 145, 147.

According to some implementation forms, if a user terminal supports both, the Femtocell and WLAN connection, it is possible to switch between a Femtocell service (e.g. UMTS HSXPA) and a WLAN service seamlessly.

According to some implementation forms, the remote antennas 153, 155, 157 are placed at different locations but can for example have an overlapping coverage.

According to some implementation forms, the redundancy of multiple installations of Femtocell base stations and WLAN base stations is reduced. Thus, the energy consumption and the demand on backhaul are lower, which saves operational costs for the wireless services. Furthermore, the transmission power is reduced.

Figure 3:
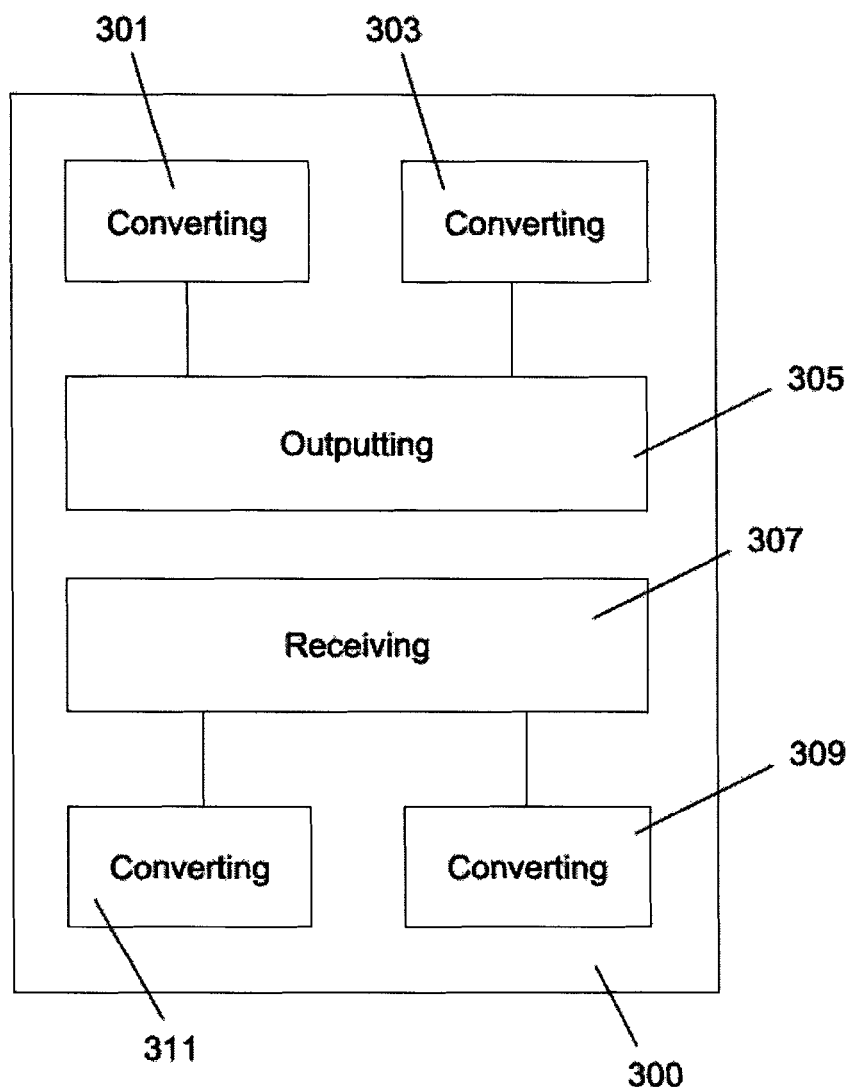
FIG. 3 shows a diagram of a Femtocell/WLAN communication method according to an implementation form.

FIG. 3 shows a diagram of a method for Femtocell/WLAN communications according to an implementation form. The method depicted in FIG. 3 deploys the Femtocell/WLAN communication device as shown in FIG. 1. Furthermore, the method comprises said steps of converting 301 the first electrical output signal of the Femtocell module into a first optical output signal by the second conversion path, converting 303 the second electrical output signal of the WLAN module into a second optical output signal by the second conversion path, outputting 305 the first optical output signal and the second optical output signal common port, receiving 307 the first optical input signal and the second optical input signal via a common port, converting 309 a first optical input signal into the first electrical input signal by the third second conversion path, and converting 311 a second optical input signal into the second electrical input signal by the fourth conversion path.

Further steps of the method depicted in FIG. 3 are directly derivable from the functionality of the Femtocell/WLAN communication device and/or system described herein.

What is claimed is:

1. A Femtocell/wireless local area network (WLAN) communication device, comprising:
    a Femtocell module for cellular wireless communications, wherein the Femtocell module has an input for receiving a first electrical input signal and an output for outputting a first electrical output signal;
    a WLAN module for WLAN communications, wherein the WLAN module has an input for receiving a second electrical input signal and an output for outputting a second electrical output signal;
    a set of power amplifiers connected to the Femtocell module and the WLAN module, wherein the set of power amplifiers is configured to amplify the first electrical input signal, the first electrical output signal, the second electrical input signal, and the second electrical output signal;
    an optical interface having a first conversion path connected to the output of the Femtocell module, a second conversion path connected to the output of the WLAN module, a third conversion path connected to the input of the Femtocell module, and a fourth conversion path connected to the input of the WLAN module, wherein the first conversion path is configured to convert the first electrical output signal of the Femtocell module into a first optical output signal, wherein the second conversion path is configured to convert the second electrical output signal of the WLAN module into a second optical output signal, wherein the third conversion path is configured to convert a first optical input signal into the first electrical input signal, and wherein the fourth conversion path is configured to convert a second optical input signal into the second electrical input signal;
    a common port for receiving the first optical input signal and the second optical input signal and for outputting the first optical output signal and the second optical output signal, and
    wherein the optical interface comprises a directional coupler connected to both an optical-to-electrical converter and to an electrical-to-optical converter, wherein the direction coupler is configured to couple the first conversion path, the second conversion path, the third conversion path, and the fourth conversion path to the common port for receiving the first optical input signal and the second optical input signal and for outputting the first optical output signal and the second optical output signal.

2. The Femtocell/WLAN communication device of claim 1, wherein the first electrical output signal and the second electrical output signal are analog signals, and wherein the first conversion path is configured to directly convert the first electrical output signal into the first optical output signal, and wherein the second conversion path is configured to directly convert the second electrical output signal into the second optical output signal.

3. The Femtocell/WLAN communication device of claim 1, wherein the first electrical input signal and the second electrical input signal are analog signals, wherein the third conversion path is configured to directly convert the first optical input signal into the first electrical input signal, and wherein the fourth conversion path is configured to directly convert a second optical input signal into the second electrical input signal.

4. The Femtocell/WLAN communication device of claim 1, wherein the first conversion path and the second conversion path comprise a common electrical to optical converter, and wherein the third conversion path and the fourth conversion path comprise a common optical to electrical converter.

5. The Femtocell/WLAN communication device of claim 1, wherein the Femtocell module is configured to communicate upon the basis of at least one of the following communication technologies: Universal Mobile Telecommunications System (UMTS), UMTS High Speed Packet Access X (HSXPA), and Long Term Evolution (LTE).

6. The Femtocell/WLAN communication device of claim 1, wherein the Femtocell module is a Femtocell base station or a Femtocell access point.

7. The Femtocell/WLAN communication device of claim 1, wherein the common port is connected to an optical fiber.

8. The Femtocell/WLAN communication device of claim 1, further comprising a common network port coupled to a network port of the Femtocell module and to a network port of the WLAN module.

9. The Femtocell/WLAN communication device of claim 1, wherein the Femtocell/WLAN communication device is configured to communicate over an optical fiber upon the basis of the radio-to-fiber technology.

10. A Femtocell/wireless local area network (WLAN) communication method for cellular wireless/WLAN communications using a Femtocell module for cellular wireless communications and a WLAN module for WLAN communications, wherein the Femtocell module has an input for receiving a first electrical input signal and an output for outputting a first electrical output signal, wherein the WLAN module has an input for receiving a second electrical input signal and an output for outputting a second electrical output signal, and using an optical interface having a first conversion path connected to the output of the Femtocell module, a second conversion path connected to the output of the WLAN module, a third conversion path connected to the input of the Femtocell module, and a fourth conversion path connected to the input of the WLAN module, wherein the optical interface further comprises a directional coupler coupling the first conversion path, the second conversion path, the third conversion path, and the fourth conversion path to a common port, the method comprising:
 converting the first electrical output signal of the Femtocell module into a first optical output signal by the first conversion path;
 converting the second electrical output signal of the WLAN module into a second optical output signal by the second conversion path;
 outputting the first optical output signal and the second optical output signal via the directional coupler at the common port;
 receiving the first optical input signal and the second optical input signal via the directional coupler at the common port wherein the directional coupler is connected to both an optical-to-electrical converter and to an electrical-to-optical converter;
 converting a first optical input signal into the first electrical input signal by the third conversion path;
 converting a second optical input signal into the second electrical input signal by the fourth conversion path; and
 amplifying the first electrical input first electrical output signal, the second electrical input signal, and the second electrical output signal by power amplifiers that are connected to the Femtocell module and the WLAN module.

11. An apparatus comprising:
 a Femtocell module comprising a first electrical input and a first electrical output;
 a wireless local area network (WLAN) module comprising a second electrical input and a second electrical output;
 a set of power amplifiers connected to the Femtocell module and the WLAN module, wherein the set of power amplifiers is configured to amplify the first electrical input, the first electrical output the second electrical input, and the second electrical output; and
 an optical interface comprising:
  an electrical to optical (E-O) converter coupled to the first electrical output and the second electrical output;
  an optical to electrical (O-E) converter coupled to the first electrical input and the second electrical input;
  a directional coupler coupled to both the E-O converter and the O-E converter; and
  a common optical port coupled to the directional coupler.

12. The apparatus of claim 11, wherein the E-O converter is configured to produce a first optical output signal from the first electrical output and produce a second optical output signal from the second electrical output.

13. The apparatus of claim 12, wherein the O-E converter is configured to produce the first electrical input from a first optical input signal and produce the second electrical input from a second optical input signal.

14. The apparatus of claim 13, wherein the common optical port is configured to receive the first optical input signal and the second optical input signal and output the first optical output signal and the second optical output signal.

15. The apparatus of claim 14, wherein the common optical port is configured to be communicatively coupled to a single fiber optic cable and is configured to receive the first optical input signal and the second optical input signal and output the first optical output signal and the second optical output signal using the single fiber optic cable.

16. The apparatus of claim 15, wherein the optical interface is configured to transmit signals through the single fiber optic cable using radio-over-fiber technology.

17. The apparatus of claim 16, wherein the radio-over-fiber technology comprises modulating light by a radio signal and transmitting the modulated light to one or more antennas.

18. The apparatus of claim 17, further comprising a common network port coupled to a network port of the Femtocell module and to a network port of the WLAN module.

19. The apparatus of claim 18, wherein the common network port comprises an Ethernet port.

* * * * *

UNITED STATES PATENT AND TRADEMARK OFFICE
CERTIFICATE OF CORRECTION

PATENT NO. : 8,750,171 B2
APPLICATION NO. : 13/728309
DATED : June 10, 2014
INVENTOR(S) : Egon Schulz et al.

It is certified that error appears in the above-identified patent and that said Letters Patent is hereby corrected as shown below:

In the claims:

Column 9, Lines 14 through Column 10, Line 2, Claim 10, should read:
"10. A Femtocell/wireless local area network (WLAN) communication method for cellular wireless/WLAN communications using a Femtocell module for cellular wireless communications and a WLAN module for WLAN communications, wherein the Femtocell module has an input for receiving a first electrical input signal and an output for outputting a first electrical output signal, wherein the WLAN module has an input for receiving a second electrical input signal and an output for outputting a second electrical output signal, and using an optical interface having a first conversion path connected to the output of the Femtocell module, a second conversion path connected to the output of the WLAN module, a third conversion path connected to the input of the Femtocell module, and a fourth conversion path connected to the input of the WLAN module, wherein the optical interface further comprises a directional coupler coupling the first conversion path, the second conversion path, the third conversion path, and the fourth conversion path to a common port, the method comprising:
 converting the first electrical output signal of the Femtocell module into a first optical output signal by the first conversion path;
 converting the second electrical output signal of the WLAN module into a second optical output signal by the second conversion path;
 outputting the first optical output signal and the second optical output signal via the directional coupler at the common port;
 receiving the first optical input signal and the second optical input signal via the directional coupler at the common port, wherein the directional coupler is connected to both an optical-to-electrical converter and to an electrical-to-optical converter;
 converting a first optical input signal into the first electrical input signal by the third conversion path;
 converting a second optical input signal into the second electrical input signal by the fourth conversion path; and Signed and Sealed this
Fourth Day of August, 2015

Michelle K. Lee
*Director of the United States Patent and Trademark Office* amplifying the first electrical input signal, the first electrical output signal, the second electrical input signal, and the second electrical output signal by power amplifiers that are connected to the Femtocell module and the WLAN module."

Column 10, Lines 3-21, Claim 11, should read:

"11. An apparatus comprising:

a Femtocell module comprising a first electrical input and a first electrical output;

a wireless local area network (WLAN) module comprising a second electrical input and a second electrical output;

a set of power amplifiers connected to the Femtocell module and the WLAN module, wherein the set of power amplifiers is configured to amplify the first electrical input, the first electrical output, the second electrical input, and the second electrical output; and an optical interface comprising:

an electrical to optical (E-O) converter coupled to the first electrical output and the second electrical output;

an optical to electrical (O-E) converter coupled to the first electrical input and the second electrical input;

a directional coupler coupled to both the E-O converter and the O-E converter; and a common optical port coupled to the directional coupler."